United States Patent
Ben Naim et al.

(10) Patent No.: US 12,423,406 B1
(45) Date of Patent: Sep. 23, 2025

(54) TECHNIQUES, MACHINE INTELLIGENCE, AND MECHANISMS FOR SUSPICIOUS ENTITY CLUSTERING USING CREDENTIAL INFORMATION

(71) Applicant: Malantai LTD., Modiin (IL)

(72) Inventors: Kobi Ben Naim, Shaalvim (IL); Yossi Dantes, Petah Tikva (IL); Guy Ben Arie, Holon (IL); Tal Kandel, Katzir (IL)

(73) Assignee: Malantai Ltd., Modiin (IL)

( * ) Notice: Subject to any disclaimer, the term of this patent is extended or adjusted under 35 U.S.C. 154(b) by 0 days.

(21) Appl. No.: 18/980,850

(22) Filed: Dec. 13, 2024

Related U.S. Application Data

(60) Provisional application No. 63/699,905, filed on Sep. 27, 2024.

(51) Int. Cl.
*G06F 21/45* (2013.01)
*G06F 21/62* (2013.01)

(52) U.S. Cl.
CPC .......... *G06F 21/45* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 11,093,462 B1* | 8/2021 | Rabbani | G06F 16/215 |
| 2022/0182397 A1* | 6/2022 | Romero Zambrano | H04L 63/1416 |
| 2024/0037197 A1* | 2/2024 | Yarabolu | G06F 21/6218 |
| 2024/0073012 A1* | 2/2024 | Neumann | H04L 9/0861 |

* cited by examiner

*Primary Examiner* — Brandon Hoffman
(74) *Attorney, Agent, or Firm* — Finnegan, Henderson, Farabow, Garrett & Dunner LLP

(57) ABSTRACT

Disclosed herein are techniques for clustering cyber credential information. Techniques include aggregating a plurality of cyber credentials; computing similarity scores for pairs of the cyber credentials; clustering at least a subset of the cyber credentials into a plurality of cyber credential clusters based on the computed similarity scores; digitally tagging the cyber credential clusters with suspicious entity information; and generating a data structure of the digitally tagged cyber credential clusters.

22 Claims, 5 Drawing Sheets

TECHNIQUES, MACHINE INTELLIGENCE, AND MECHANISMS FOR SUSPICIOUS ENTITY CLUSTERING USING CREDENTIAL INFORMATION

CROSS-REFERENCE TO RELATED APPLICATIONS

This application claims priority to U.S. Provisional Patent App. No. 63/699,905, filed on Sep. 27, 2024, which is incorporated herein by reference in its entirety.

TECHNICAL FIELD

The subject matter described herein generally relates to techniques for improving cybersecurity for digital assets. Such techniques may be applied to publicly or privately networked resources. For example, certain disclosed embodiments are directed to expanding digital asset scope, such as by analyzing cyber credential information.

BACKGROUND

Many networked digital assets exist in systems that are accessible not only through private connections, but are also accessible using wider networks, such as the internet, which can expose the digital assets to unwanted access and uses. Current protections against this often involve access restrictions, such as through credentials or IP configurations. Digital assets, however, often change, spawn, and terminate rapidly and can outpace the ability of an organization to adequately protect the digital assets and identify potential exposures. Moreover, many organizations only apply resource protection tests using internal digital information.

In view of the technical deficiencies of current systems, there is a need for improved systems and techniques for expanding digital asset scope, identifying cyber exposures, and distilling this information for automatic or manual response. Cyber exposures are unique to cyber environments and are more effectively addressed with the unconventional the proactive, predictive, and/or AI-based approaches discussed below. The unique techniques described below offer advantages in terms of detection, functionality, protection, usability, and efficiency.

SUMMARY

Some disclosed embodiments describe non-transitory computer-readable media, systems, and methods for clustering cyber credential information. For example, in an exemplary embodiment, a method may include aggregating a plurality of cyber credentials; computing similarity scores for pairs of the cyber credentials; clustering at least a subset of the cyber credentials into a plurality of cyber credential clusters based on the computed similarity scores; digitally tagging the cyber credential clusters with suspicious entity information; and generating a data structure of the digitally tagged cyber credential clusters.

In accordance with further embodiments, the pairs of cyber credentials comprise pairs of passwords and pairs of aliases.

In accordance with further embodiments, computing the similarity scores comprises using at least one of a Hamming distance algorithm or a Levinstein distance algorithm.

In accordance with further embodiments, the method further comprises: generating supplemental cyber credentials based on character equivalence rules and the plurality of cyber credentials; and computing supplemental similarity scores using the supplemental cyber credentials, wherein the clustering is based on the computed supplemental similarity scores.

In accordance with further embodiments, the method further comprises clustering the plurality of cyber credential clusters into mega-clusters.

In accordance with further embodiments, clustering the at least a subset of the cyber credentials into a plurality of cyber credential clusters comprises: clustering a first subset of the cyber credentials into at least one first cluster of a first type; clustering a second subset of the cyber credentials into at least one second cluster of a second type; identifying a common connection between a first node in the first cluster and a second node in the second cluster; and including in the plurality of cyber credential clusters a third node associated with the first node and the second node.

In accordance with further embodiments, clustering the at least a subset of the cyber credentials into a plurality of cyber credential clusters comprises: clustering pairs of passwords into password clusters and clustering pairs of aliases into alias clusters; and merging the password clusters with the alias clusters to generate merged clusters, wherein the plurality of cyber credential clusters includes the merged clusters.

In accordance with further embodiments, the suspicious entity information identifies at least one of a code repository, a domain, a certificate, a social network profile, a legal entity, a financial entity, a cloud service account, a business application, a botnet, or an organization.

In accordance with further embodiments, the method further comprises accessing the plurality of cyber credentials from a dataset of leaked credential information.

In accordance with further embodiments, the suspicious entity information comprises malicious likelihood scores associated with respective cyber credential clusters; and the malicious likelihood scores are based on the computed similarity scores.

In accordance with further embodiments, higher computed similarity scores are correlated with higher malicious likelihood scores.

In accordance with further embodiments, clustering the at least a subset of the cyber credentials comprises clustering a first subset of the cyber credentials, but not a second subset of the cyber credentials, into the plurality of cyber credential clusters; and the method further comprises classifying the second subset of the cyber credentials as associated with non-suspicious actors.

In accordance with further embodiments, the first subset of the cyber credentials are clustered into the plurality of cyber credential clusters based on their respective computed similarity scores exceeding a similarity score threshold.

In accordance with further embodiments, the method further comprises causing display of a visual depiction of the data structure of the digitally tagged cyber credential clusters.

In accordance with further embodiments, the method further comprises: receiving an input at a user interface; providing the input to a language model; and receiving, from the language model, an identification of at least one of the plurality of cyber credentials or a source of the plurality of cyber credentials.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION OF EXEMPLARY EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1:
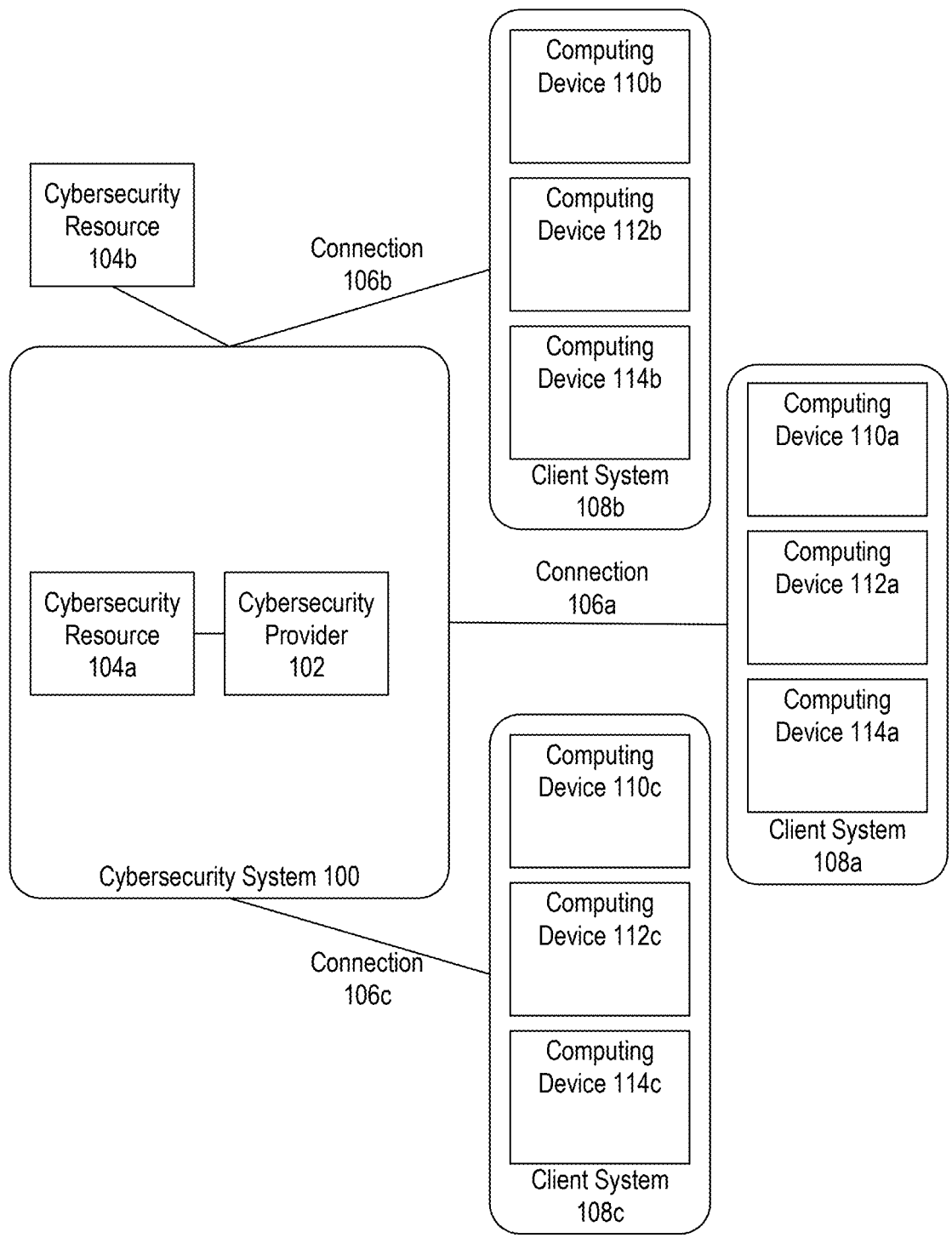
FIG. 1 illustrates an exemplary pictographic representation of a network architecture for providing cybersecurity to devices, consistent with embodiments of the present disclosure.

FIG. 1 illustrates an exemplary pictographic representation of network architecture 10, which may include a cybersecurity system 100. Cybersecurity system 100 may be maintained, for example, by a cybersecurity provider, an artificial intelligence (AI) analysis provider, a developer, a networking entity, an entity associated with maintaining multiple computing devices, or any combination of these entities. System 100 may include a cybersecurity provider 102, which may be a single device or combination of devices. Cybersecurity provider 102 may, for example, include at least one computing device 200, described in further detail with respect to FIG. 2. Cybersecurity provider 102 may be in communication with at least one network resource, such as cybersecurity resource 104a, which may be internal to cybersecurity system 100, and/or cybersecurity resource 104b, which may be external to cybersecurity system 100. A network resource may be a database, supercomputer, general purpose computer, special purpose computer, virtual computing resource (e.g., a virtual machine or a container), graphics processing unit (GPU), or any other data storage or processing resource. For example, a network resource may be a database 214, discussed further below.

Network architecture 10 may also include any number of client systems, such as device systems 108a, 108b, and 108c. A client system may be, for example, a computer system, an organizational network, a business network, a home security system, an inventory monitoring system, a connected appliance, a network routing device, a smart power grid system, an aircraft (e.g., a drone or other unmanned vehicle), a hospital monitoring system, a vehicle (e.g., an autonomous vehicle), any Internet of Things (IoT) system, or any arrangement of one or more computing devices. A device system may include devices arranged in a local area network (LAN), a wide area network (WAN), or any other communications network arrangement. Further, each controller system may include any number of devices, which may be, for example, personal computers. For example, exemplary device system 108a includes computing devices 110a, 112a, and 114a, which may have the same or different functionalities or purposes. These devices are discussed further through the description of exemplary computing device 200, discussed with respect to FIG. 2. Device systems 108a, 108b, and 108c may connect to system 100 through connections 106a, 106b, and 106c, respectively. A connection 106 (exemplified by connections 106a, 106b, and 106c) may be a communication channel, which may include a bus, a cable, a wireless (e.g., over-the-air) communication channel, a radio-based communication channel, a local area network (LAN), the Internet, a wireless local area network (WLAN), a wide area network (WAN), a cellular communication network, or any Internet Protocol (IP) based communication network and the like. Connections 106a, 106b, and 106c may be of the same type or of different types, and may include combinations of types (e.g., the Internet and a LAN). Digital information may be transmitted between devices and systems across any of these connections, and may be formatted according to one or more of Transmission Control Protocol (TCP), User Datagram Protocol (UDP), Internet Protocol (IP, such as IP version 4, known as IPv4, or IP version 6, known as IPv6), HyperText Transfer Protocol (HTTP), File Transfer Protocol (FTP), Internet Message Access Protocol (IMAP), Post Office Protocol (POP), or any other digital encoding or formatting technique.

Any combination of components of network architecture 10 may perform any number of steps of the exemplary processes discussed herein, consistent with the disclosed exemplary embodiments.

Figure 2:
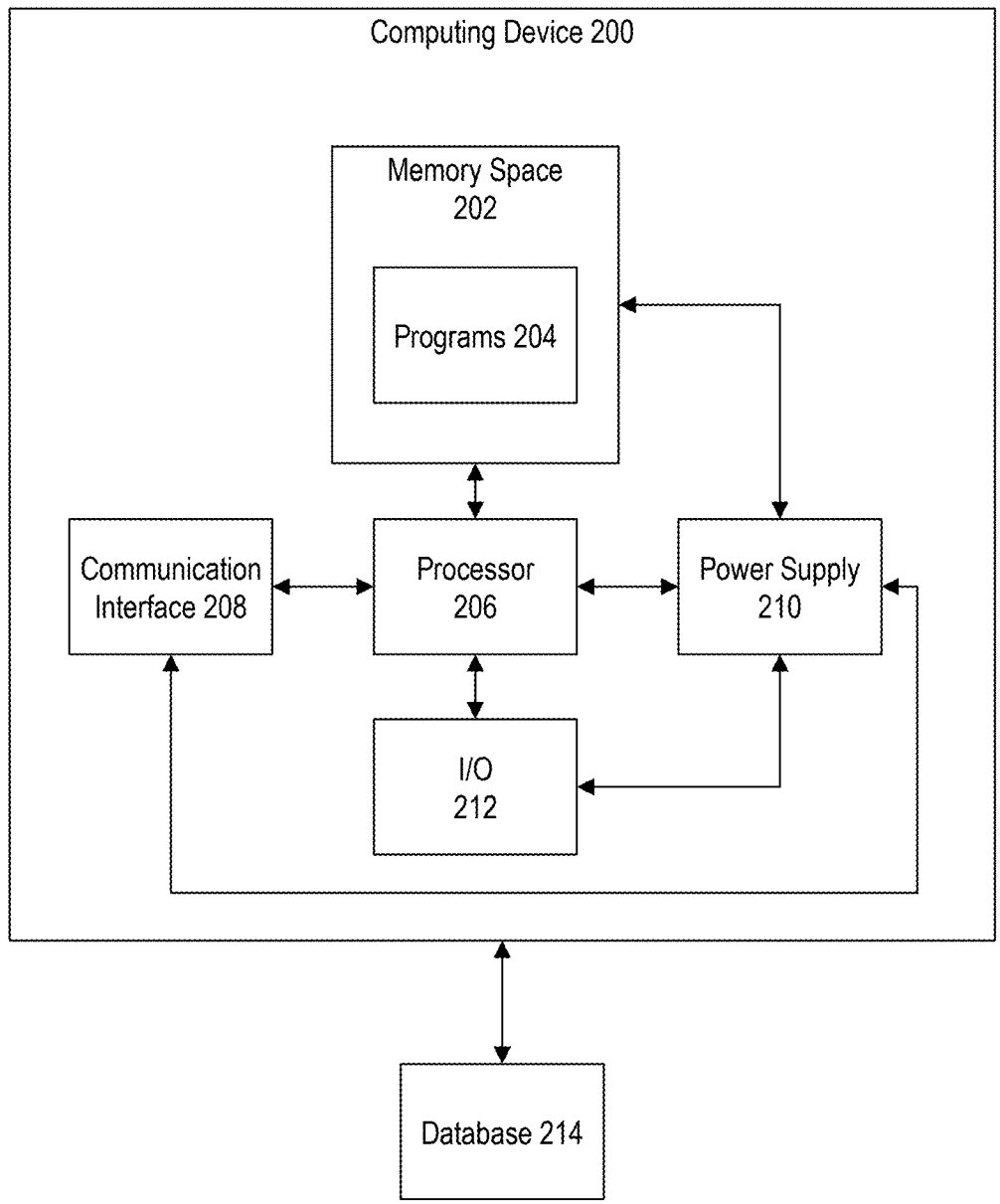
FIG. 2 illustrates an exemplary pictographic representation of a computing device, consistent with embodiments of the present disclosure.

FIG. 2 illustrates an exemplary pictographic representation of computing device 200, which may be a computer, a tablet, a phone (e.g., a smartphone), a virtualized computing instance (e.g., a virtual machine or a container), a server, headset (e.g., virtual or augmented reality headset), an IoT device, or a controller, etc. Further, in some embodiments computing device 200 may be a combination of one or more of these types of computing devices. In various embodiments, computing devices may be a single or localized instance, or may be distributed (physically or logically). Computing device 200 may be configured (e.g., through software program(s) 204) to perform a single function (e.g., as a special purpose computer), or multiple functions. Computing device 200 may perform any number of steps of the exemplary processes discussed herein, consistent with the disclosed exemplary embodiments.

Computing device 200 may include a memory space 202 and at least one processor 206. Memory space 202 may include a single memory component, or multiple memory components. Such memory components may include an electronic storage device, a magnetic storage device, an optical storage device, an electromagnetic storage device, a semiconductor storage device, etc., or any suitable combination of the foregoing. For example, memory space 202 may include any number of hard disks, random access memories (RAMs), read-only memories (ROMs), erasable programmable read-only memories (EPROMs or Flash memories), and the like. Memory space 202 may include one or more storage devices configured to store instructions usable by processor 206 to perform functions related to the disclosed embodiments. For example, memory space 202 may be configured with one or more software instructions, such as software program(s) 204 or code segments that perform one or more operations when executed by processor 206 (e.g., the operations discussed in connection with figures below). The disclosed embodiments are not limited to separate programs or computers configured to perform dedicated tasks. For example, memory space 202 may include a single program or multiple programs that perform the functions associated with network architecture 10. Memory space 202 may also store data that is used by one or more software programs (e.g., data relating to controller functions, data obtained during operation of the vehicle, or other data).

In certain embodiments, memory space 202 may store software executable by processor 206 to perform one or more methods, such as the methods discussed below. The software may be implemented via a variety of programming techniques and languages, such as C, C+, C++, C#, PHP, Java, JavaScript, Python, and various others. Memory space 202 may store software as compiled code, uncompiled code, or a combination of both.

Processor 206 may include one or more dedicated processing units, application-specific integrated circuits (ASICs), field-programmable gate arrays (FPGAs), graphical processing units, or various other types of processors or processing units coupled with memory space 202.

Computing device 200 may also include a communication interface 208, which may allow for local and/or remote devices to interact with computing device 200. Communication interface 208 may include an antenna or wired connection to allow for communication to or from computing device 200. For example, one device (such as a device of a cybersecurity provider 102) may send code or other digital information (e.g., cybersecurity analytics information) to another device (such as computing device 112*c*).

Computing device 200 may also include power supply 210, which may be an AC/DC converter, DC/DC converter, regulator, or battery internal to a physical housing of computing device 200, and which may provide electrical power to computing device 200 to allow its components to function. In some embodiments, a power supply 210 may exist external to a physical housing of a computing device (i.e., may not be included as part of computing device 200 itself), and may supply electrical power to multiple computing devices (e.g., all controllers within a controller system, such as a device system 108*a*).

Computing device 200 may also include input/output device (I/O) 212, which may be configured to allow for a user or device to interact with computing device 200. For example, I/O 212 may include at least one of wired and/or wireless network cards/chip sets (e.g., WiFi-based, cellular based, etc.), an antenna, a display (e.g., graphical display, textual display, etc.), an LED, a router, a touchscreen, a keyboard, a microphone, a speaker, a haptic device, a camera, a button, a dial, a switch, a knob, a transceiver, an input device, an output device, or another I/O device configured to perform, or to allow a user to perform, any number of steps of the methods of the disclosed embodiments, as discussed further below.

In some embodiments, computing device 200 may connect to a device not shown in network architecture 10, such as a database 214 (which may also be connected with, connectable with, and/or part of cybersecurity system 100). For example, I/O 212 may connect computing device 200 to an electronic connection, such as a connection 106, which may allow computing device 200 to electronically communicate with database 214. Database 214 may include digital information, which may relate to one or more entities or sub-entities. For example, database 214 may include electronic resource usage statistics, cybersecurity credential information, social media information, network traffic information, email traffic information, or computer networking information (e.g., IP addresses, port numbers, etc.), contextual information, cyber asset information, etc. Database 214 may include any number of disk drives, servers, server arrays, server blades, memories, or any other medium capable of storing data. Database 214 may be configured in a number of fashions, including as a textual database, a centralized database, a distributed database, a hierarchical database, a relational database (e.g., SQL), an object-oriented database, or in any other configuration suitable for storing data. While database 214 is shown as connected to a single computing device 200 it is appreciated that it may be connected or connectable to multiple devices.

In some embodiments, a computing device, such as cybersecurity provider 102, may have access to (e.g., may store) and/or be configured to implement (e.g., execute) one or more artificial intelligence (AI) models. AI models may include one or more of a statistical model, a regression model (e.g., one or more regression layers), a stochastic model, a probabilistic model, a language model (e.g., a large language model, or LLM), an encoder-decoder model, a transformer model, a neural network (e.g., one or more neural network layers, a deep neural network (DNN), a recurrent neural network, also called an RNN, a convolutional neural network, also call a CNN), a random forest, a generative adversarial network (GAN), a support-vector machine (SVM), a bag-of-words model, a Word2Vec model, a sequence-to-sequence model, a learning model, a predictive model or any other AI-based digital tool. Additionally or alternatively, a model may operate using Retrieval-Augmented Generation (RAG) and/or Agentic AI. Additionally or alternatively, a model may include at least one encoder and at least one decoder, for example in an encoder-decoder structure. It is appreciated that the human mind is not equipped to perform the operations for which an AI model is configured, given its arrangement and combination of model elements (e.g., nodes, layers, parameters, connections), as well as its ability to process inputs not practically understandable to the human mind (e.g., compiled code). An AI model may include a natural language processing (NLP) model, a natural language generation (NLG) model, a code language processing model (e.g., a large code language model, or LCLM), or any other model discussed herein. In some embodiments, an AI model may be integrated with (e.g., communicably connected to) a user interface, consistent with disclosed embodiments. An AI model may also be configured to interpret and use multiple types of inputs and outputs. For example, an AI model may be configured to interpret human language inputs (e.g., to a user interface), HTTP information, network traffic information, and/or any computing language or format.

Figure 3:
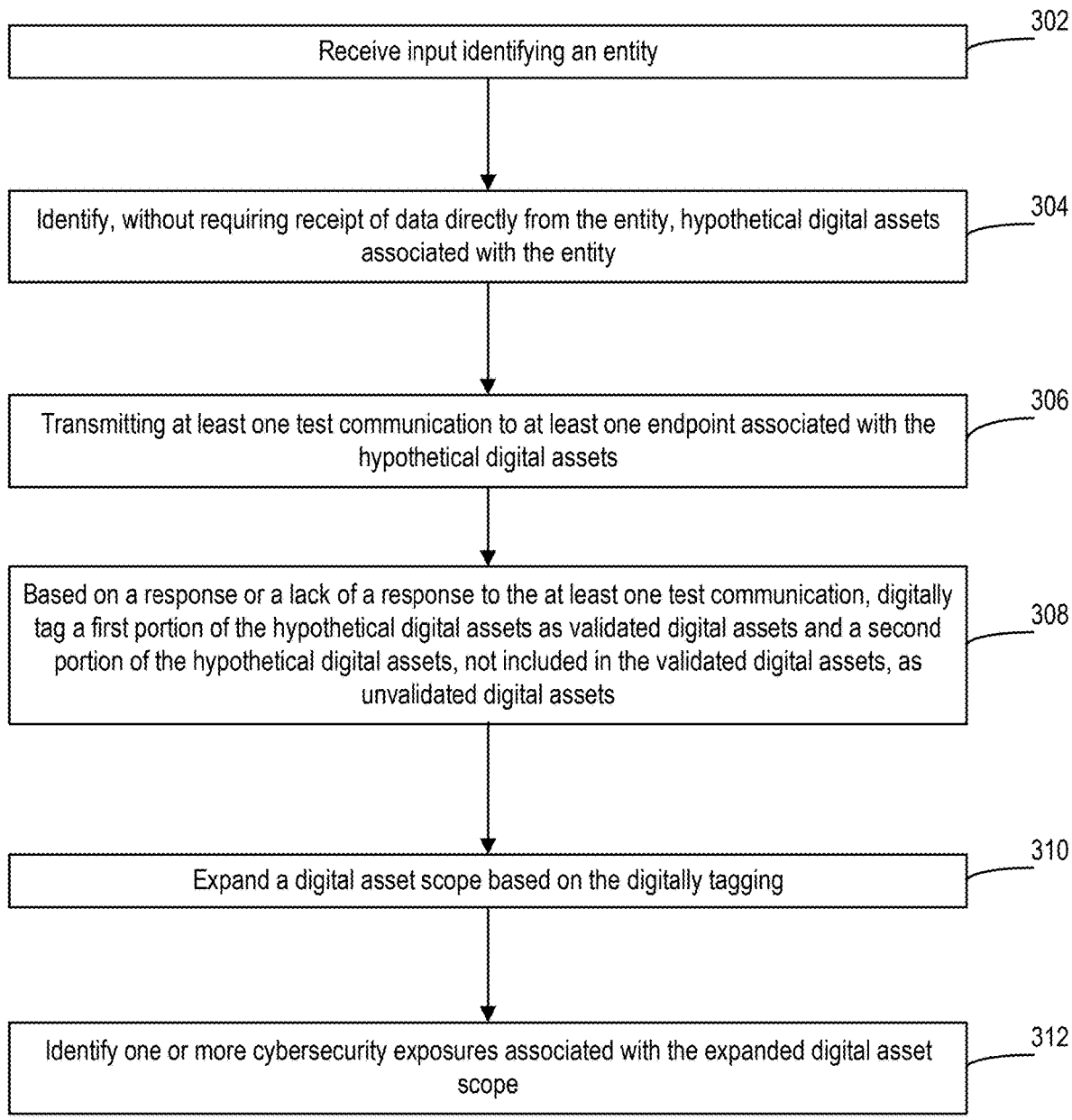
FIG. 3 depicts a flowchart of an exemplary process for generating digital asset intelligence, consistent with embodiments of the present disclosure.

FIG. 3 shows an exemplary process 300 for generating digital asset intelligence. In accordance with disclosed embodiments, process 300 may be implemented in cybersecurity system 100 depicted in FIG. 1, or various other types of network environments. For example, process 300 may be performed by at least one processor (e.g., processor 206), memory (e.g., memory space 202), and/or other components of cybersecurity provider 102, or by any computing device. Accordingly, while process 300 may be referred to as an actor below, it is appreciated that at least one processor, device, etc. may also perform the described operation. In some embodiments, steps (e.g., operations) may be added or removed from process 300. Additionally or alternatively, steps in process 300 may be repeated and/or rearranged.

Additionally or alternatively, two or more steps in process 300 may be performed simultaneously or substantially simultaneously. In some embodiments, process 300 may be a zero-touch method, which may include a method that operates without accessing particular information (e.g., information beyond a threshold, information maintaining by a particular entity, information maintained by a particular system or device, information of a particular type, etc.). All or part of process 300 may be implemented in conjunction with all or part of other processes discussed herein (e.g., process 400 and/or process 500). For example, credential information may be clustered according to process 400 based on an input received in process 300 (e.g., at step 302). Additionally, as another example, one or more cybersecurity exposures identified by process 300 may be depicted in a graphical user interface (GUI) according to process 500.

At step 302, process 300 may receive an input identifying an entity. Receiving an input identifying an entity may include accessing the input, detecting the input, receiving the input at an interface (e.g., a user interface), storing the input, and/or re-formatting the input. In some embodiments, process 300 may extract information from the input, which may be used in subsequent electronic communications to at least one downstream entity (e.g., a database, model, etc.). For example, process 300 may reformat the extracted information and/or supplement the extracted information with API calls or other machine language.

An input may include text, an audio recording, HTTP information, or any digital information from which information about the entity can be derived by a machine. For example, the input may include an identifier of an organization (in embodiments where the entity is an organization). As an additional non-limiting example, an input may be a natural language input to a user interface. As yet another non-limiting example, a user may input "XYZ Inc." or a company name without a corporate entity type identification into a text input field of a GUI. In some embodiments, the input may not identify the entity directly. For example, an input of "HP" may not directly identify, but may still be associated with, HP Development Company, L.P.™

As discussed above, in some embodiments, the input may include an identifier of an organization. In some embodiments, process 300 may include identifying the entity based on an identifier of the organization (e.g., a corporate name, a corporate shorthand name, a stock ticker symbol, and/or the like). In some embodiments, the entity and the organization may have a corporate parent-child relationship or other corporate relationship. For example, the entity may be a corporate child of the organization. Alternatively, the entity may be a corporate parent of the organization. In some embodiments, process 300 may identify the entity by accessing (e.g., crawling, parsing, and/or validating) data sources that include corporate organization information (e.g., corporate trees). For example, process 300 may search one or more data sources using the identifier of the organization to determine an identity of the entity.

In some embodiments, the input may be received at a user interface (e.g., application programming interface, known as an API, GUI, combination thereof, etc.) and/or provided to a language model. The language model may be configured to identify the hypothetical digital assets based on the input (or prompt another model or entity to do the same). For example, in some embodiments, process 300 may provide the input and/or information extracted from the input to a language model (or other AI model). Based on the input and/or extracted information, the language model may determine or predict (e.g., using semantic analysis, NLP analysis, pattern matching, corpus analysis, linguistic analysis, etc.) an entity corresponding to the input. In some embodiments, process 300 may prompt a user for additional input (e.g., by displaying one or more of a text notification, text input field, graphic icon, graphic associated with an entity, etc.) to provide to the language model for a more accurate (e.g., having a higher probability of accuracy) entity identification.

An entity may be a group of devices, systems, digital resources, networking resources, individuals, or any combination thereof. For example, an entity may include at least one of a corporate entity, a business entity, a financial entity, an individual, or an organization. In some embodiments, the entity may be associated with (e.g., may host or maintain) one or more private networks (e.g., LANs, virtual private networks, also known as VPNs, etc.). For example, in some embodiments, the entity may include at least one of a corporate entity, a business entity, a financial entity, an individual, or an organization.

At step 304, process 300 may identify, without requiring receipt of data directly from the entity, hypothetical digital assets associated with the entity. The identifying may include searching a resource (e.g., a database), crawling a resource (e.g., a webpage, a web resource, network traffic information), establishing at least one identifier (e.g., an IP address number) of at least one hypothetical digital asset, and/or adding identifiers of, and/or information associated with, the hypothetical digital assets into a data structure. For example, in some embodiments, the hypothetical digital assets may be identified based on crawling one or more data sources. In some embodiments, the data sources may include computer and/or networking language, such as HTML code, uncompiled code, IP addresses, media access control (MAC) addresses, port numbers, and/or any identifier of a hypothetical digital asset. Crawling, as used throughout, may include accessing, downloading, searching, extracting, indexing, classifying, and/or storing, digital information, consistent with disclosed embodiments. Crawling may be performed automatically, may be performed without visually or auditorily outputting at least a portion of the crawled information (e.g., any crawled information), may be performed by using a web browser embedded in a program or application or by using a command line tool, and/or may include parsing HTML code and/or networking information.

A hypothetical digital asset may include electronic-based information or hardware that is associated with, or has a threshold probability of being associated with, a particular entity. For example, a hypothetical digital asset may include at least one of a web asset, a cloud asset, a certificate, a key, an email address, an email server, an email security configuration, an IP address, a port, a Domain Name System (DNS) record, a service, a third-party asset, a supply chain asset, a social media account, a brand, exposed data (e.g., leaked data, stolen data, hacked data, etc.), information in a public code repository, a software version, an IoT device, a domain, a subdomain, a uniform resource identifier (URI), or a uniform resource locator (URL). For example, in some embodiments, process 300 may identify a plurality of email addresses, a plurality of services, a plurality of servers, and/or a plurality of IP addresses as hypothetical digital assets.

In some embodiments, at least one of the hypothetical digital assets may be an IP range determined based on at least one IP address identified by crawling the one or more data sources. For example, process 300 may identify an IP range that includes the at least one IP address (e.g., at the center of the range). Additionally or alternatively, process 300 may identify an IP range including multiple IP addresses for a single subnet (e.g., 256 addresses or fewer). In some embodiments, the IP range may be discontinuous. In some embodiments, process 300 may determine an IP address range based on (e.g., used) information from at least one cloud provider, at least one Internet Service Provider (ISP) and/or at least one domain structure. Additionally or alternatively, process 300 may transmit test communications to multiple IP addresses (e.g., in a particular range) and identify a hostname based on one more or more responses to the test communications.

In some embodiments, process 300 may generate a digital identifier of one of hypothetical digital assets (e.g., as part of, or separate from, step 302). At least one of content or syntax (e.g., characters marking one or more fields) of the digital identifier (e.g., server name, IP address, certificate, service name, etc.) may be based on information crawled from the one or more data sources. In some embodiments, the digital identifier may identify a potential recipient entity (e.g., device, IP address, port, system, combination thereof, etc.) of an electronic communication. In some embodiments, the digital identifier may include at least one of an email address or an IP address. Additionally or alternatively, the digital identifier may be generated based on a pattern identified by a model. For example, an AI language model may analyze multiple digital identifiers (e.g., digital identifiers with differing syntax, digital identifiers with similar syntax and different content, hundreds of digital identifiers, thousands of digital identifiers, and/or any combination thereof) and may learn one or more predicted patterns (e.g., patterns having at least a threshold probability of being associated with a group of digital identifiers and/or a particular entity). In some embodiments, the pattern may include an email address syntax pattern. For example, a model may identify a pattern of [employee first name].[employee last name]@[entity domain name]. As another example, a model may identify a pattern of [employee last name][employee first initial]@[entity domain name].

In some embodiments, the data sources may be identified using the input. For example, process 300 may parse the input to determine an entity name or other entity-related information, and may determine one or more data sources that may include information related to one or more digital assets of the entity (e.g., one or more data sources that have a threshold probability of including information related to one or more digital assets of the entity). In some embodiments, the data sources may include information that was intentionally or unintentionally made accessible by the entity. For example, the data sources may include at least one of a webpage, a website, a social network, or a database of leaked information.

As discussed above, in some embodiments, process 300 may identify the hypothetical digital assets without requiring receipt of data directly from the entity. Additionally, process 300 may identify the hypothetical digital assets without receiving data directly from the entity. Alternatively, process 300 may identify the hypothetical digital assets based at least in part on data received directly from the entity. Additionally or alternatively, process 300 may identify the hypothetical digital assets without connecting to a private network that is associated with (e.g., maintained by, hosted by) the entity. In some embodiments, the private network may include, host, protect, have information concerning, and/or have access to at least some of the hypothetical digital assets.

In some embodiments, identifying the hypothetical digital assets associated with the entity may include generating artificial digital assets and/or identifiers of artificial digital assets. An artificial digital asset may be considered a digital asset whose status as a real-world digital asset is unknown, unconfirmed, and/or suspected. In some embodiments, the generated artificial digital assets may be included among the hypothetical digital assets. It is appreciated that identifying the hypothetical digital assets implementing a solution rooted in computer technology and contributes to the complex problem of understanding vast accumulations of digital assets and potential exposures.

At step 306, process 300 may transmit at least one test communication to at least one endpoint associated with the hypothetical digital assets. A test communication may include an electronic message, such as a ping (e.g., command prompt ping to an IP address, an Internet Control Message Protocol (ICMP) packet, an email message, a message based on a tracert command, or any other communication configured to elicit a response from a recipient endpoint. An endpoint may include an intended recipient device, system, or digital entity (e.g., email address), which may be the last recipient of a test communication along one direction of communication.

In some embodiments, transmitting the at least one test communication may include transmitting at least one test communication to each of a plurality of IP addresses (e.g., included in the hypothetical digital assets, as discussed above). The IP addresses may be predicted to be associated with the entity (e.g., at step 304).

In some embodiments, transmitting the at least one test communication may include transmitting one or more port validation requests to one or more services. Additionally or alternatively, transmitting the at least one test communication may include transmitting status requests to one or more services or other resources associated with one or more endpoints. Process 300 may also receive test-communication responses (e.g., responses including port information, operational status information, or the like) from at least a subset of the services. In some embodiments, process 300 may obtain at least one service header (e.g., an HTTP header) of the at least a subset of the services. For example, process 300 may obtain a service header for each service of the subset. Obtaining a service header may include parsing a test-communication response and extracting the service header from the response based on a detected syntax of the test-communication response. In some embodiments, process 300 may identify at least one server based on the at least one service header. Process 300 may also associate the at least one server with the entity and/or one or more services, which may also be associated with the entity. For example, the server may be associated with the at least a subset of the services and at least one of the test-communication responses.

In some embodiments, process 300 may include the digital identifier in the at least one test communication. For example, process 300 may include at least one of an IP address, server name, service name, or port number in the at least one test communication. Additionally, process 300 may include a time-to-live (TTL) in the at least one test communication.

After transmitting the at least one test communication to at least one endpoint, process 300 may receive a response to the at least one communication. A response may include at least one of a confirmation of receipt of the at least one test communication, a confirmation of the accuracy of information included in the at least one test communication (e.g., accuracy of an identifier), confirmation that a hypothetical digital asset is affiliated with the entity, a response time, a time of receipt, a status of the recipient (e.g., online, accepting messages, not accepting messages, etc.), or any indication that the at least one test communication reached a recipient. In some embodiments, a response may be received from another point (e.g., device) in a chain of communication between the transmitting device and the endpoint (e.g., including the transmitting device). For example, a response may indicate that an endpoint is unavailable, invalid, unreachable, and/or that a request (e.g., a test communication) timed out.

In some embodiments, after transmitting the at least one test communication to at least one endpoint, process 300 may not receive a response. Additionally, in some embodiments, process 300 may transmit at least one first test communication and at least one second test communication, and may receive at least one response to the at least one first test communication and may not receive any response to the at least one second test communication. Of course, other sequences and combinations are possible as well.

In some embodiments, in addition to or instead of transmitting a test communication (which may be considered probing directly), process 300 may probe for digital assets by accessing other resources (which may be considered probing indirectly). For example, process 300 may probe one or more resources outside a target premise (e.g., outside of the endpoint and/or any endpoint associated with the entity, such as offline systems), which may be referred to as exterior resources, to validate a digital asset. An exterior resource may include one or more of at least one database record (e.g., DNS database record), at least one log file, or website code (e.g., HTML code). In some embodiments, results of indirectly probing may be used to validate or increase an accuracy probability of results of directly probing, and vice versa.

At step 308, process 300 may, based on a response or a lack of a response to the at least one test communication, digitally tag a first portion of the hypothetical digital assets as validated digital assets and a second portion of the hypothetical digital assets, not included in the validated digital assets, as unvalidated digital assets. Digitally tagging may include at least one of storing an association (e.g., between a digital tag and a hypothetical digital asset) in a data structure, encoding with information, applying metadata to, or otherwise digitally connecting an indicator (e.g., valid or invalid) with a hypothetical digital asset. For example, process 300 may digitally tag hypothetical digital assets associated with a response (e.g., from which a response was received) as validated digital assets, and may tag hypothetical digital assets associated with a lack of a response (e.g., from which no response was received or from which no response was received in a threshold amount of time) as unvalidated digital assets. In some embodiments, a validated digital asset may be associated with an indicator that it is associated with the entity. Additionally or alternatively, an unvalidated digital asset may be associated with an indicator that it is not associated with the entity and/or that it is indeterminate that it is associated with the entity.

In some embodiments, a response to the at least one test communication may include a response from an email server indicating a valid recipient (e.g., endpoint) associated with an email address included in the at least one test communication.

As discussed above, transmitting the at least one test communication may include transmitting at least one test communication to each of a plurality of IP addresses. In some embodiments, process 300 may receive test-communication responses from a first subset of the IP addresses within a time threshold (e.g., 10 milliseconds, 100 milliseconds, 1 second, 10 seconds, 1 minutes, etc.). Process 300 may also have a lack of receipt of test-communication responses from a second subset of the IP addresses within the time threshold. In some embodiments, the first subset of the IP addresses may be digitally tagged as validated IP addresses based on receipt of test-communication responses from the first subset within the time threshold. Additionally or alternatively, the first subset of the IP addresses may be digitally tagged as validated IP addresses based on receipt of test-communication responses from the first subset between two time thresholds. Additionally or alternatively, the second subset of the IP addresses may be digitally tagged as unvalidated IP addresses based on a lack of receipt of test-communication responses from the second subset within the time threshold.

In some embodiments, process 300 may identify at least some digital assets without using any test communications. For example, process 300 may identify one or more valid email addresses (e.g., digital assets) based on the inclusion of the one or more email addresses in a registry (e.g., an online registry).

Additionally or alternatively to digitally tagging based on responses or lack of responses, process 300 may, based on a result of indirectly probing (as discussed above), digitally tag a first portion of the hypothetical digital assets as validated digital assets and a second portion of the hypothetical digital assets, not included in the validated digital assets, as unvalidated digital assets. For example, if a digital asset is identified in one or more exterior resources, it may be digitally tagged as validated digital assets (e.g., part of the first portion). If a digital asset is not identified in one or more exterior resources, it may be digitally tagged as an unvalidated digital asset (e.g., part of the second portion).

In some embodiments, process 300 may apply at least one threshold to the digital tagging process. For example, process 300 may tag a digital asset as validated if it identifies it in a threshold number of exterior resources. As another exclusive example, process 300 may tag a digital asset as validated if it is validated based on a communication response and appears in a threshold number of one or more exterior resources.

At step 310, process 300 may expand a digital asset scope based on the digital tagging. Expanding a digital asset scope may include adding to, subtracting from, or changing stored digital information associated with digital assets of an entity. A digital asset scope may be represented by or included in a data structure, graphic, file (e.g., Extensible Markup Language file, also called an XML file, and/or a JavaScript Object Notation file, also called a JSON file).

In some embodiments, process 300 may learn from an expanded digital asset scope, which may improve operations, models, data structures, or other computing components for subsequent expansions of the same digital asset scope or a different digital asset scope. For example, process 300 may receive at least one of (a) a machine input from a system that is implementing process 300 or a separate system or (b) a user input, which process 300 may use together with the expanded digital asset scope generated at step 310 to reconfigure one or more parameters (e.g., data collection parameters, data source parameters, model parameters, etc.) for improving digital asset scope expansion. For example, process 300 may receive a validation dataset (e.g., including one or more validated identifications of a digital asset), which it may use to determination one or more parameter reconfigurations. As another non-mutually exclusive example, process 300 may receive a user input identifying one or more digital resources (e.g., included in the expanded asset scope) as valid or invalid.

At step 312, process 300 may identify one or more cybersecurity exposures associated with the expanded digital asset scope. Identifying one or more cybersecurity exposures may include determining cybersecurity information with at least a threshold probability of being associated with a cybersecurity exposure, identifying one or more validated digital assets that are exposed to cyber risks (e.g., exposed to unauthorized access), and/or determining one or more cybersecurity risks to the entity and/or one or more of the validated digital assets.

A cybersecurity exposure may include an opportunity for disclosure of information related to at least one digital asset. For example, a cybersecurity exposure may include a digital asset that can be accessed in an unauthorized way, can be accessed by an unauthorized entity, can be manipulated (e.g., used) in an unauthorized way, and/or can be used to allow for authorized access or manipulation of another digital asset. For example, a cyber security exposure may include a digital asset that is vulnerable, misconfigured, redundant, mismanaged, and/or unmanaged. by way of further example, a cybersecurity exposure may include a service or email account that can be accessed by (e.g., is determined to have a probability of being accessed by) unauthorized entities. As another non-mutually exclusive example, a cybersecurity exposure may include a digital asset included in a dark web entity or leaked information. Additionally or alternatively, a cybersecurity exposure may include a cyber exposure described below with respect to process 500.

In some embodiments, process 300 may optionally include transmitting an indication of the unvalidated digital assets and/or the one or more cybersecurity exposures. The indication may include at least one of a data structure (e.g., including identifiers of the unvalidated digital assets and/or the one or more cybersecurity exposures, an API response, a graphic (e.g., indicating relationships between, locations of, networking information of, and/or cybersecurity information of, the unvalidated digital assets and/or the one or more cybersecurity exposures), and/or any communication identifying the unvalidated digital assets and/or the one or more cybersecurity exposures. In some embodiments, the indication may be transmitted to a source device of the input identifying the entity. For example, the indication may be transmitted to a device that received a user input including the input (e.g., at step 302) and/or that transmitted the input or information associated with the input to a device (e.g., at least one processor) operating process 300. In some embodiments, the indication may include a GUI, as described with respect to process 500. It is appreciated that process 300 may transmit the indication without requiring any additional input from an initiating entity other than the input received at step 302, which may allow an entity (e.g., system, network, etc.) to identify cybersecurity exposures while preventing creation of downtime or slowdowns (e.g., processing slowdowns, data transmission slowdowns, or any negative operational effects). It is appreciated that the techniques of this process improve analysis and protections of cyber environments, which are vulnerable to risks unique to networked computing environments, by providing a particularized non-conventional and non-generic arrangement of technical components that can rapidly and accurately expand digital asset scope with minimal user input. Additionally, substantial digital analytics can be provided without connecting to internal systems for additional information, allowing those systems to continue to operate without increasing usage of their limited computing and networking resources.

Figure 4:
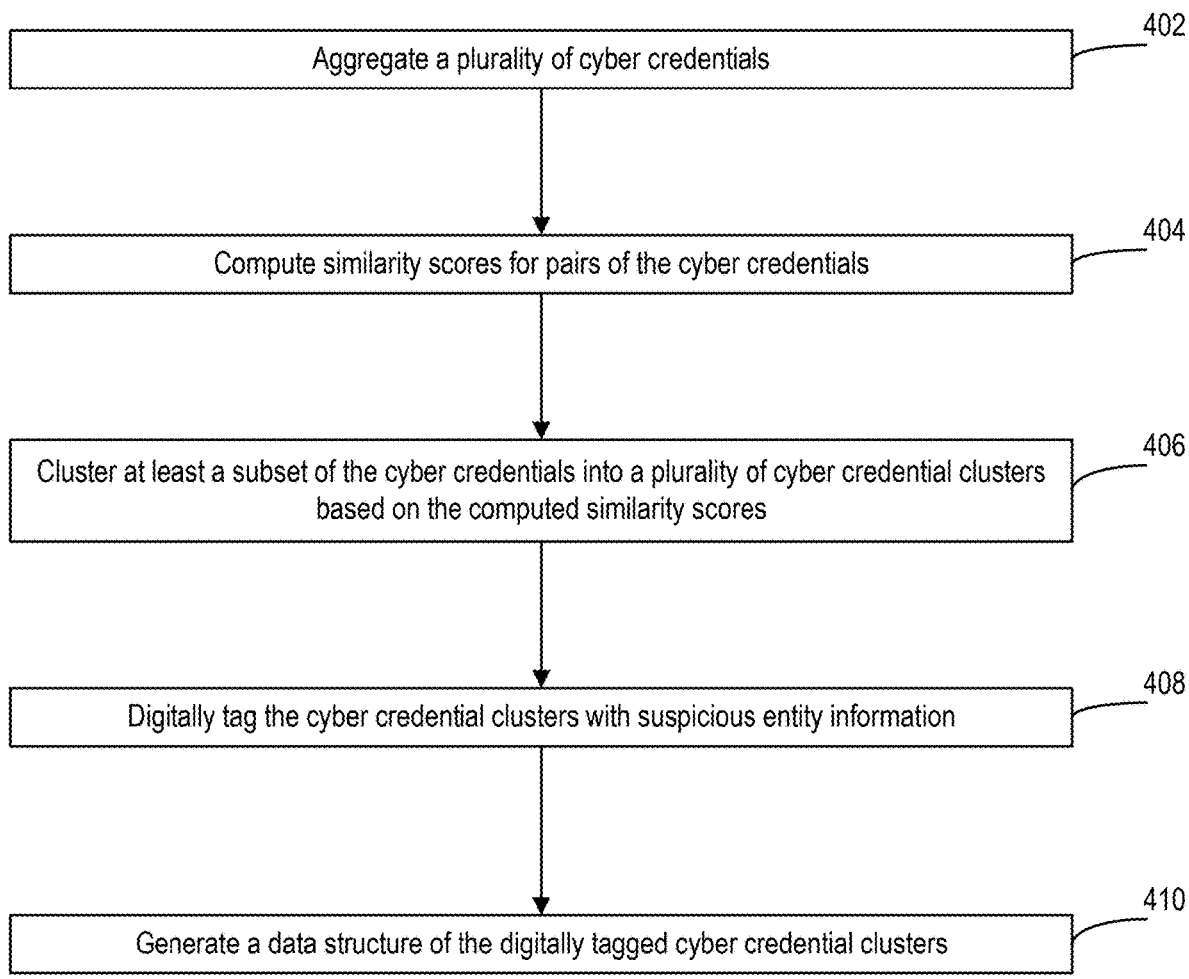
FIG. 4 depicts a flowchart of an exemplary process for clustering cyber credential information, consistent with embodiments of the present disclosure.

FIG. 4 shows an exemplary process 400 for clustering cyber credential information. In accordance with disclosed embodiments, process 400 may be implemented in cybersecurity system 100 depicted in FIG. 1, or various types of network environments. For example, process 400 may be performed by at least one processor (e.g., processor 206), memory (e.g., memory space 202), and/or other components of cybersecurity provider 102, or by any computing device. Accordingly, while process 400 may be referred to as an actor below, it is appreciated that at least one processor, device, etc. may also perform the described operation. In some embodiments, steps (e.g., operations) may be added or removed from process 400. Additionally or alternatively, steps in process 400 may be repeated and/or rearranged. Additionally or alternatively, two or more steps in process 400 may be performed simultaneously or substantially simultaneously. In some embodiments, process 400 may be a zero-touch method, which may include a method that operates without accessing particular information (e.g., information beyond a threshold, information maintained by a particular entity, information maintained by a particular system or device, information of a particular type, etc.). All or part of process 400 may be implemented in conjunction with all or part of other processes discussed herein (e.g., process 300 and/or process 500). For example, credential information may be clustered according to process 400 and used to identify one or more cybersecurity exposures in process 300 (e.g., at step 312). Additionally, as another example, process 500 may compute one or more risk scores for the credential information clustered according to process 400.

At step 402, process 400 may aggregate a plurality of cyber credentials. A cyber credential may include at least one of an alias, a username, a password, an address (e.g., email address), an identification number, a pin, a biometric identifier, a code, or any other combination of information configured to authenticate a user to provide access to restricted digital information. In some embodiments, a cyber credential may be considered a combination of pieces of information, for example a username and a password or an email address and password. Aggregating the plurality of cyber credentials may include identifying the cyber credentials, accessing the cyber credentials, accessing information associated with the cyber credentials, identifying a source of the cyber credentials (e.g., data repository), determining a commonality of the cyber credentials (e.g., determining that the cyber credentials are associated with a same entity, system, and/or network), crawling one or more sources for cyber credentials (e.g., web-based sources), and/or any pooling cyber credentials (e.g., from multiple sources). For example, process 400 may identify a plurality of cyber credentials that are associated with a same entity (e.g., organization, system, network, company, etc.) and may pool those cyber credentials in a storage location (e.g., memory device).

In some embodiments, process 400 may include accessing (e.g., prior to aggregation) the plurality of cyber credentials from a dataset of leaked credential information. For example, process 400 may connect to a network (e.g., the Internet) and crawl one or more sources (e.g., web sources) to extract credential information (e.g., passwords, aliases, IP addresses, individual identifiers, port numbers, etc.), which may have been unintentionally disclosed (e.g., stolen, maliciously elicited) from an organization.

In some embodiments, step 402 may be performed based on (e.g., in response to) a request input received at a device (e.g., a request to cluster cyber credential information). For example, an input may be from a user and may include an identifier of an entity to a device and process 400 may use that identifier to determine cyber credential information for analysis (e.g., clustering). As another example, an input may be a machine input from a system distinct (e.g., separate) from a device executing processing 400, such as an identity credential system that may generate an input associated with a request (e.g., to the device executing process 400) for determining whether a credential is malicious or benign. Additionally, any or all steps of process 400 may be performed based on the request input.

At step 404, process 400 may compute similarity scores for pairs of the cyber credentials. A pair of cyber credentials may include two distinct sets of cyber credentials capable of comparison (e.g., direct or indirect machine comparison). Each set of cyber credentials may include a single credential segment (e.g., a password) or a combination of multiple credential segments (e.g., a password and an email address). For example, a pair of cyber credentials may include a first password-username combination and a second password-username combination. Additionally or alternatively, the pairs of cyber credentials may include pairs of passwords and pairs of aliases. Multiple cyber credentials (e.g., within a pair) may be different or the same (e.g., character-by-character). Additionally, multiple cyber credentials may be from the same or different sources (e.g., data repositories, web sources, etc.).

Computing a similarity score may include determining (e.g., using an algorithm) a metric representing an amount of commonality between two pieces of information (e.g., cyber credentials). For example, computing a similarity score may include comparing characters between a first cyber credential and a second cyber credential and/or determining a degree of similarity between the compared characters. In some embodiments, computing the similarity score may include converting cyber credentials to a Euclidean space, coordinate space, or any quantified representation. Additionally or alternatively, computing the similarity score may include applying a space mapping (e.g., vector space mapping) and/or similarity calculation algorithm. For example, computing the similarity score may include using at least one of a Hamming distance algorithm, Levinstein distance algorithm, a Manhattan distance algorithm, a Minkowski distance algorithm, or a Chebyshev distance algorithm. Additionally or alternatively, a kernel function may be used. In some embodiments, a higher similarity score may be correlated with a higher amount of commonality between two pieces of information.

In some embodiments, two characters may be considered more similar if they are exactly the same, if they are in a same class (e.g., symbols, digits, alpha characters, punctuation, top level domain, etc.) if they have a same meaning, and/or if they are equivalent according to an equivalency rule. In some embodiments, a similarity score may be computed based on multiple character-to-character comparisons and their associated degrees of similarity.

In some embodiments, process 400 may make character comparisons between characters with the same or similar positions between credentials. For example, a second character appearing in a first cyber credential may be compared to a second character appearing in a second cyber credential. In some embodiments, particular characters or types of characters may be ignored or treated according to different rules than other characters. For example, an underscore may be ignored. As another example, two characters that are both symbols (e.g., a same class, such as @, #, $, %, ^, &, *, etc.) may be considered equivalent, similar, or partially equivalent.

At step 406, process 400 may cluster at least a subset of the cyber credentials into a plurality of cyber credential clusters based on the computed similarity scores. Clustering cyber credentials may include grouping a subset of the cyber credentials into common groups based on cyber credentials in the subset having a threshold similarity score with at least one other cyber credential in the subset. Additionally or alternatively, clustering cyber credentials may include grouping a subset of the cyber credentials into common groups based on each cyber credential in the subset having at least a threshold similarity score with all other cyber credentials in the subset.

In some embodiments, clustering the at least a subset of the cyber credentials into a plurality of cyber credential clusters may include clustering a first subset of the cyber credentials into at least one first cluster of a first type. A type of cluster may include a cluster that is associated with a particular entity (e.g., suspicious entity), a cluster that is associated with a particular type of credential (e.g., email addresses, email login credential combinations, application login credential combinations, an alias, a username, a password, an address, an email address, a name, a first name, a last name, an identification number, a pin, a biometric identifier, a code etc.), and/or a cluster that is associated with a particular source of information (e.g., a database of leaked information, public information from an online social network, etc.).

Additionally or alternatively, clustering the at least a subset of the cyber credentials into a plurality of cyber credential clusters may include clustering a second subset of the cyber credentials into at least one second cluster of a second type. Process 400 may also include (e.g., as part of the clustering) identifying a common connection between a first node in the first cluster and a second node in the second cluster. A common connection may include a pattern (e.g., a character pattern within cyber credentials, a syntax pattern within cyber credentials, a creation pattern of cyber credentials, etc.), a common character, a common sequence of characters, a common source, a common ostensible individual (e.g., credentials relating to and/or impersonating an individual), a common source of credential information, and/or a common entity (e.g., suspicious entity associating with generating fake credential information). A node may include a distinct informational unit (e.g., one or more cyber credentials) that is included in and/or represented by a cluster. Process 400 may also include (e.g., as part of the clustering) including in the plurality of cyber credential clusters a third node associated with the first node and the second node. For example, the third node may include information from the first and/or second nodes, may be based on information from the first and/or second nodes, and/or may include a pointer to at least one of the first or second nodes.

Additionally or alternatively, clustering the at least a subset of the cyber credentials into a plurality of cyber credential clusters may include clustering pairs of passwords into password clusters and clustering pairs of aliases into alias clusters. A password cluster may include a group of passwords (e.g., without any alias information), which may or may not be associated with a common source or entity. An alias cluster may include a group of aliases (e.g., without any password information), which may or may not be associated with a common source or entity. Clustering the at least a subset of the cyber credentials into a plurality of cyber credential clusters may also include merging the password clusters with the alias clusters to generate merged clusters. Merging the password clusters with the alias clusters may include clustering aliases and passwords that are in the same alias and password clusters and are associated with each other (e.g., are part of a same cyber credential combination, which may have been obtained from a source) into a same merged cluster. In some embodiments, the plurality of cyber credential clusters (e.g., as discussed above) may include the merged clusters.

In some embodiments, process 400 may include (e.g., as part of step 406) generating supplemental cyber credentials based on character equivalence rules and the plurality of cyber credentials. A character equivalence rule may include a definition of one character or combination of characters as being equivalent to another character or combination of characters. As a nonexclusive example, a character equivalence rule may include a definition that the "at" sign ("@") is equivalent to the letter A (e.g., "a" and/or "A"). As another nonexclusive example, a character equivalence rule may include a definition that an underscore ("_") is equivalent to a space (" "). As yet another nonexclusive example, a character equivalence rule may include a definition that a year is equivalent to the last two digits of that year (e.g., "1996" is equivalent to "96"). As yet another nonexclusive example, a character equivalence rule may include a definition that a name is equivalent to a nickname (e.g., "Michael" is equivalent to "Mike," "William" is equivalent to "Bill," etc.). Supplemental cyber credentials may include cyber credentials (e.g., password and alias combinations) that are based on, but not found precisely among, the plurality of cyber credentials. For example, generating the supplemental cyber credentials may include generating cyber credentials (e.g., aliases, passwords, combinations thereof, etc.) that are within a similarity threshold of, but not identical to, the plurality of cyber credentials. By way of further example, generating the supplemental cyber credentials may include removing one or more characters from the plurality of cyber credentials and replacing the removed characters with equivalent characters (e.g., as defined by the equivalence rules). Additionally or alternatively, generating the supplemental cyber credentials may include inserting or appending characters to at least one of the plurality of cyber credentials. For example, "_1984" may be inserted to "mike.test@yahoo.com" to create "mike.test_1984@yahoo.com".

In some embodiments, process 400 may include computing supplemental similarity scores using the supplemental cyber credentials. For example, process 400 may compute supplemental similarity scores for combinations within the supplemental cyber credentials and/or between at least a portion of the supplemental cyber credentials and the plurality of cyber credentials. In some embodiments, the clustering (e.g., performed at step 406) may be based on the computed supplemental similarity scores. For example, process 400 may generate clusters that include supplemental similarity scores, similarity scores for only the plurality of cyber credentials (e.g., without supplements), or a combination of both.

In some embodiments, the at least a subset of cyber credentials may be clustered using other information in addition to, or instead of, the similarity scores. For example, in some embodiments, the at least a subset of cyber credentials may be clustered based on a degree of proximity in creation date (e.g., creation of user accounts associated with respective cyber credentials) and/or an association with a common user (e.g., first and/or last name of a user).

In some embodiments, clustering the at least a subset of the cyber credentials may include clustering a first subset of the cyber credentials, but not a second subset of the cyber credentials, into the plurality of cyber credential clusters. For example, the first subset of the cyber credentials may be clustered into the plurality of cyber credential clusters based on their respective computed similarity scores exceeding a similarity score threshold. Additionally, process 400 may determine that each of the second subset of cyber credentials do not have a similarity score with another cyber credential that reaches a similarity score threshold, and based on this determination may refrain from clustering them, thereby efficiently allocating processing resources. It is appreciated that clustering cyber credentials is technique rooted in technology and computationally intensive, making it impractical if not impossible for manual human performance.

At step 408, process 400 may digitally tag the cyber credential clusters with suspicious entity information. Digitally tagging the cyber credential clusters may include generating a digital marker (e.g., indicator, text, flag, content in a data field, etc.) and linking it to another digital information segment (e.g., cyber credential, cyber credential cluster). Suspicious entity information may be or include an indication of association with a cybercrime (e.g., a cybercriminal organization), an indication of imitation or impersonation of a real or authenticated entity, an indication of identity theft, information identifying an entity or event associated with at least one cyber credential (e.g., the source of an impersonating account, such as a cyber criminal organization). Additionally or alternatively, the suspicious entity information may identify at least one of a code repository, a domain, a certificate, a social network profile, a legal entity, a financial entity, a cloud service account, a business application, a botnet, or an organization.

Additionally or alternatively, the suspicious entity information may include and/or may be based on malicious likelihood scores associated with respective cyber credential clusters. For example, a cyber credential cluster may be tagged with suspicious entity information if that cyber credential cluster has an associated malicious likelihood score exceeding a threshold. A malicious likelihood score may be based on indicators of malicious behavior associated with one or more cyber credential clusters (e.g., indicators correlated with malicious behavior). Additionally or alternatively, a malicious likelihood score may be based on (e.g., determined by) a trained model (e.g., one of the AI models discussed above). For example, a trained model may represent the correlations between cyber credential clusters and malicious behavior and/or may use the correlations to determine a degree of malicious behavior exhibited by a cyber credential cluster and/or a likelihood that a cyber credential cluster is associated with a malicious entity. In some embodiments, the malicious likelihood scores may be based on the computed similarity scores. Additionally, higher computed similarity scores may be correlated with higher malicious likelihood scores.

In some embodiments, suspicious entity information and/or malicious likelihood scores may calculated over time and/or recalculated at different times (e.g., periodically). For example, process 400 may digitally tag a cyber credential cluster may as benign and/or as having a lower malicious likelihood score at a first time, and may digitally tag the cyber credential cluster as potentially malicious and/or as having a higher malicious likelihood score (e.g., exceeding a threshold) at a second time, which may be based on additional cluster information (e.g., clustering of a different combination of credentials, clustering of new credentials, clustering of a subset of earlier clustered credentials, and/or a combination thereof, such as by iterating process 400).

In some embodiments, process 400 may include clustering the plurality of cyber credential clusters into megaclusters. A mega-cluster may be considered a cluster of clusters, or any defined association between multiple clusters (e.g., based on computed similarity). For example, process 400 may compute similarity scores, coordinate representations (e.g., Cartesian representations), or any numerical representations for the cyber credential clusters, and may cluster those clusters into other clusters (e.g., mega-clusters), such as based on a proximity of the values computed for the clusters. By way of further example, process 400 may cluster cyber credential clusters into a common mega-cluster based on determining that those cluster cyber credential clusters have associated numerical representations that are within a threshold (e.g., fixed value, a standard deviation, etc.) of each other.

As discussed above, process 400 may cluster a first subset of the cyber credentials, but not a second subset of the cyber credentials, into the plurality of cyber credential clusters. In some embodiments, process 400 may classify the second subset of the cyber credentials as associated with non-suspicious (e.g., non-malicious) actors. For example, process 400 may digitally tag the second subset of the cyber credentials based on the classification. For example, process 400 may generate and/or link a digital marker to the second subset of the cyber credentials that indicates that the second subset of the cyber credentials is associated with non-suspicious actors.

At step 410, process 400 may generate a data structure of the digitally tagged cyber credential clusters. A data structure may include a matrix, a chart, a heatmap, a web, a graph, or any other representation of digital information (e.g., cyber credential clusters). In some embodiments, process 400 may include digitally tagged cyber credential clusters associated with suspicious behavior (e.g., potentially malicious behavior, behavior associated with a malicious likelihood score exceeding a threshold) and digitally tagged cyber credential clusters associated with non-suspicious behavior in the same data structure. Alternatively, process 400 may include digitally tagged cyber credential clusters associated with suspicious behavior and digitally tagged cyber credential clusters associated with non-suspicious behavior in separate data structures.

In some embodiments, process 400 may include causing display of a visual depiction of the data structure of the digitally tagged cyber credential clusters. A visual depiction of the data structure may include a table, a chart, a heatmap, a web (e.g., of nodes, of clusters). In some embodiments, the visual depiction may include a broad-view, which may show one level of information (e.g., in a web), but which may be configured to surface additional information based on a user interaction. For example, in response to a user interaction (e.g., click, touch, etc.) with a node in a web, process 400 may generate an additional visual depiction displaying information associated with that node (e.g., a chart of cyber credentials associated with that node). In this manner, cyber information may be efficiently displayed while still allowing a user to access targeted and more granular cyber information.

In some embodiments, the displaying may occur in response to a request input (for example, as described above). In some embodiments, a device may receive an input (e.g., a natural language text input) at a user interface. The input may be subsequently provided input to a language model (e.g., an AI model, discussed above). Additionally, the device receiving the input and/or any number of other devices may receive, from the language model, an identification of at least one of the plurality of cyber credentials or a source of the plurality of cyber credentials. For example, the language model may interpret the natural language input and convert it into an input (e.g., structured data, API-formatted data, HTML data, etc.) understandable by an analyzer (e.g., model, analysis device, combination thereof) configured to perform process 400, and may transmit the converted input to the analyzer, which may prompt it to execute operations of process 400 based on the converted input. The analyzer may generate a data structure and/or visual depiction of a data structure, as discussed above. The analyzer may transmit this information (or a representation of it) to the device that received the input. In some embodiments, instead of or in addition to the data structure and/or visual depiction of a data structure, the analyzer may transmit NLG text to the device that describes analysis results (e.g., associated with the data structure, based on clustering, based on malicious likelihood scores, etc.). It is appreciated that this process improves the technical field of digital resource analysis through a particular set of computerized operations for effectively distilling cyber credential information with extraordinarily little user input. Accordingly, substantial digital analytics can be provided without usage of internal systems, whose important computing and networking resources are limited.

Figure 5:
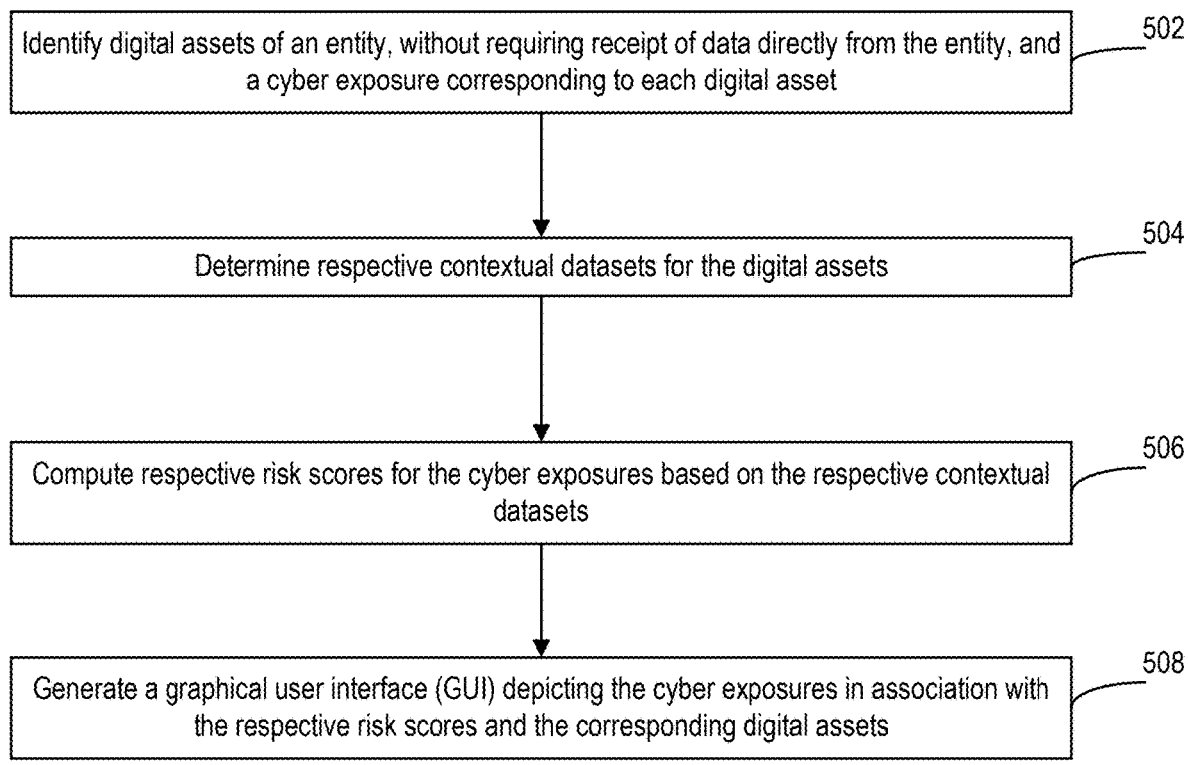
FIG. 5 depicts a flowchart of an exemplary process for distilling cyber-exposure information, consistent with embodiments of the present disclosure.

FIG. 5 shows an exemplary process 500 for distilling cyber-exposure information. In accordance with disclosed embodiments, process 500 may be implemented in cybersecurity system 100 depicted in FIG. 1, or various other types of network environments. For example, process 500 may be performed by at least one processor (e.g., processor 206), memory (e.g., memory space 202), and/or other components of cybersecurity provider 102, or by any computing device. Accordingly, while process 500 may be referred to as an actor below, it is appreciated that at least one processor, device, etc. may also perform the described operation. In some embodiments, steps (e.g., operations) may be added or removed from process 500. Additionally or alternatively, steps in process 400 may be repeated and/or rearranged. Additionally or alternatively, two or more steps in process 500 may be performed simultaneously or substantially simultaneously. In some embodiments, process 500 may be a zero-touch method, which may include a method that operates without accessing particular information (e.g., information beyond a threshold, information maintaining by a particular entity, information maintained by a particular system or device, information of a particular type, etc.). All or part of process 500 may be implemented in conjunction with all or part of other processes discussed herein (e.g., process 300 and/or process 400). For example, a cyber exposure may be identified by process 500 using operations described with respect to process 300. As another example, a cyber exposure identified by process 500 may be based on cyber credential information clustered according to process 400.

At step 502, process 500 may identify digital assets of an entity, without requiring receipt of data directly from the entity, and a cyber exposure corresponding to each digital asset. A digital asset may include any hypothetical digital asset identified above, such as at least one of a web asset, a cloud asset, a certificate, a key, an email address, an email server, an email security configuration, an IP address, a port, a Domain Name System (DNS) record, a service, a data structure, a third-party asset, a supply chain asset, a social media account, a brand, exposed data (e.g., leaked data, stolen data, hacked data, etc.), information in a public code repository, a software version, an IoT device, a domain, a subdomain, a uniform resource identifier (URI), a uniform resource locator (URL), or any other digital asset discussed herein.

In some embodiments, the digital assets may be digitally tagged as validated digital assets or unvalidated digital assets. A validated digital asset may be a digital asset that has an elevated level of confidence of being associated with (e.g., hosted by, managed by, controlled by) the entity. Additionally or alternatively, a validated digital asset may be one that is indicated as valid by a user input.

An entity may be or include at least one of a corporate entity, a business entity, a financial entity, an individual, or an organization, as discussed above. Additionally or alternatively, an entity may include a group of devices, systems, digital resources, networking resources, individuals, or any combination thereof.

A cyber exposure may include a risk, vulnerability, bug, or weakness associated with a cyber asset. For example, a cyber exposure may include an unintended possibility for an external malicious actor to access a cyber asset. In some embodiments, a cyber exposure may include or relate to multiple cyber assets. For example, a cyber asset may include a weakened cyber asset (e.g., IP address, port, etc.) that exposes another cyber asset (e.g., a service). Identifying a cyber exposure may include determining that cyber asset information is described on the internet (e.g., in records of leaked cyber credential or other cyber asset information), determining that cyber asset information is included in an unauthorized source (e.g., publicly), determining that a cyber asset is accessible (e.g., transmitting a ping or other electronic communication and determining that the cyber assets responds to the ping or other electronic communication), or determining that a cyber asset is accessible by a channel or accessor that violates an access criterion (e.g., hypothesized access criterion associated with the entity). Additionally or alternatively, a cyber exposure may include a cybersecurity exposure described above with respect to process 300.

Process 500 may identify the digital assets without requiring receipt of data directly from the entity. For example, process 500 may not receive data from a system and/or network of the entity (e.g., private system, LAN, etc.). Additionally or alternatively, process 500 may identify the digital assets without requiring receipt of sensitive information (e.g., internal information, protected information, access-restricted information) from the entity. In some embodiments, identifying a cyber asset may include operations discussed above with respect to process 300. For example, identifying the digital assets may include searching a resource (e.g., a database), crawling a resource (e.g., a webpage, a web resource, network traffic information), establishing at least one identifier (e.g., an IP address number) of at least one digital asset, and/or adding identifiers of, and/or information associated with, the digital assets into a data structure. In some embodiments, in addition to or instead of identifying digital assets, process 500 may identify hypothetical digital assets, consistent with disclosed embodiments.

In some embodiments, process 500 may include (e.g., at step 502) receiving an input at a user interface. In some embodiments, the input may identify the entity. Additionally or alternatively, the input may include or indicate a request for generation of cyber risk information (e.g., an initiation of process 500). In some embodiments, process 500 may include providing the input to a language model (e.g., an AI model, such as those discussed here). In some embodiments, the digital assets of the entity may be identified based on (e.g., using) output from the language model provided in response to the provided input. For example, the language model may use the input to identify a language (e.g., on web sources) correlated with the language in the input (e.g., language identifying a digital asset and/or associating it with the entity), such as through pattern analysis. The language model may use the identified patterns (e.g., correlations) to identify the digital assets of the entity. Additionally or alternatively, the language model may provide the identified patterns (e.g., correlations) to another model (e.g., a model implementing one or more steps of process 500), which may be configured to identify the digital assets of the entity.

At step 504, process 500 may determine respective contextual datasets for the digital assets. A contextual data may include any dataset (e.g., ad-hoc consolidated, analyzed, and/or pre-existing) that can be used by a machine to determine a relevance and/or connection of one digital asset to one or more other digital assets and/or a non-digital entity (e.g., a business). For example, a contextual dataset may include information of at least one of an entity associated with one or more of the digital assets, an owner of one or more of the digital assets, access parameters for one or more of the digital assets, an individual (e.g., a position, a title, a project, a responsibility, a name, a year of birth, etc.) associated with one or more of the digital assets, or a related asset. For example, the contextual datasets may identify at least one of an individual associated with at least one of the digital assets, a department associated with at least one of the digital assets, a digital service associated with at least one of the digital assets, a data sensitivity associated with at least one of the digital assets, an age of data accessible using at least one of the digital assets, or a digital activity performable using at least one of the digital assets.

Determining respective contextual datasets may include identifying at least one source of a contextual dataset (e.g., a website, a webpage, a code repository, a data structure, an entity, etc.), accessing at least one source of a contextual dataset (e.g., connecting to a web source), downloading a file or other data structure, crawling a resource (e.g., webpage), identifying one or more key terms, or distinguishing some data as having a stronger association with at least one digital asset than other data.

In some embodiments, process 500 may include crawling data from one or more data sources of information associated with the entity. For example, process 500 may crawl one or more webpages (e.g., HTML data) or data repositories to identify one or more contextual datasets of the entity. Process 500 may also include generating the contextual datasets based on the crawled data.

In some embodiments, the entity may be associated with a private network (e.g., VPN, LAN, etc.), and the digital assets may be identified without connecting to the private network. For example, process 500 may implement one or more operations described with respect to step 304. In some embodiments, the private network may host and/or have access to one or more of the digital assets.

At step 506, process 500 may compute respective risk scores for the cyber exposures based on the respective contextual datasets. A risk score may include a value, graphic, word, phrase, rank, and/or any representation of a degree of potential damage and/or likelihood of damage resulting from an exploit of a cyber exposure. Computing a risk score may include at least one of determining a value of a digital asset associated with a cyber exposure (e.g., determining a location of the digital asset within a hierarchy representation), determining a connectedness of a digital asset associated with a cyber exposure, determining an ease of access to a digital asset associated with a cyber exposure, determining one or more individuals associated with a digital asset associated with a cyber exposure, applying weights to any of the aforementioned, receiving a user input indicating any of the aforementioned, executing a risk score generation algorithm, or performing any operation to determine a degree of potential damage and/or likelihood of damage resulting from an exploit of a cyber exposure.

At step 508, process 500 may generate a GUI depicting the cyber exposures in association with the respective risk scores and the corresponding digital assets. In some embodiments, the generated GUI may be associated with an underlying data structure that associates the cyber exposures with the respective risk scores and/or the corresponding digital assets. The generated GUI may include one or more tables, heatmaps, graphs, or any combination of visual elements to display indicators of the cyber exposures, the associated respective risk scores, and the corresponding digital assets.

In some embodiments, the GUI may depict information associated with one or more of the cyber exposures, risk scores, and/or corresponding digital assets. For example, the GUI may depict at least one of a URL associated with at least one of the digital assets, an IP address associated with at least one of the digital assets, a geographic region associated with at least one of the digital assets, an entity responsible for at least one of the digital assets, or an exposure originator (e.g., device, user account, networking interface, system, credential, etc.) of at least one of the cyber exposures. Additionally or alternatively, the GUI may include at least one of a recommended remediation action for at least one of the cyber exposures or a link to information used to identify at least one of the cyber exposures or calculate at least one of the risk scores. For example, the GUI may include a recommendation to change an exposed IP address, change a password of an exposed digital resource, change a URL, change a URI, change a port number, open a port, close a port, or perform any action predicted (e.g., by process 500) to reduce a risk associated with a cyber exposure. As another example, the GUI may include a link that, which interacted with (e.g., clicked), redirects an interacting device to a webpage having information used to identify at least one of the cyber exposures or calculate at least one of the risk scores. Additionally or alternatively, the GUI may include a link that, when interacted with (e.g., clicked), redirects an interacting device to a digital asset (e.g., domain name, webpage, API, etc.) associated with a cyber exposure.

In some embodiments, the GUI may be interactable by a user. For example, the GUI may be configured to receive an input that may prompt an alteration to the GUI and/or prompt one or more operations of process 500 to be re-run. For example, the GUI may detect a user input (e.g., clicking, pressing, text input, audio input) indicating that one of the cyber exposures depicted in the GUI is incorrect (i.e., is not a legitimate cyber exposure) and/or incorrectly scored. Process 500 may further include, based on the user input, re-computing the respective risk scores. For example, process 500 may re-allocate one or more weightings based on the user input (e.g., based on an input indicating that a particular type of cyber exposure is not applicable to an entity, based on input that a particular cyber asset is not associated with the entity, or based on input indicating a relative importance of a cyber asset) and may re-generate the GUI based on the re-computed respective risk scores. For example, an input may include an indication and/or description of an event (e.g., natural language input from a user). Process 500 may (e.g., based on a type of the event) re-analyze cyber exposures, risk score calculations (e.g., recompute at least one risk score), and/or digital asset identification based on (e.g., using) the input. For example, process 500 may use a model that has been trained to model a correlation between a type of event (e.g., a network configuration, a service being or coming online, a system configuration, a regulation, an addition or removal of digital assets, a new digital product launch, etc.) and one or more cyber exposures and/or digital assets, and may re-determine information to be included in the GUI based on the correlation.

In some embodiments, a first digital asset among the digital assets may be of a particular digital asset type (e.g., a service), and process 500 may include determining a behavioral envelope for second digital assets of the particular digital asset type (e.g., other services). In some embodiments, process 500 may identify the second digital assets as being connected with (e.g., associated with the same entity, accessible on the same network, accessible on the same subnet, accessible through a same domain, having a configuration reaching a similarity threshold, etc.) the first digital asset. A behavioral envelope may include one or more of an access pattern (e.g., access timing, access frequency, access duration, information accessed, and/or accessing entity), a digital resource access structure (e.g., electronic access pathway, credential information, domain structure, etc.) or any digital information indicating historical usage of one or more digital assets (e.g., the second digital assets). Process 500 may further include determining that a behavior of the first digital asset deviates from the behavioral envelope. For example, process 500 may determine that the first digital asset is accessible through a port that the second digital assets are not accessible through. Additionally or alternatively, process 500 may determine that the first digital asset is accessible through a different domain than the second digital assets. In some embodiments, at least one of the cyber exposures corresponding to the first digital asset or the risk score for the cyber exposure corresponding to the first digital asset may be based on the determined deviation. For example, process 500 may determine that, based on the deviation, a risk score for the cyber exposure corresponding to the first digital asset should be higher than it otherwise would be if the deviation were not present. It is appreciated that the techniques of this process improve machine-based analysis and predictions for protecting digital resources, which are vulnerable to risks unique to cyber environments, by providing a particularized non-conventional and non-generic arrangement of technical components, that can rapidly and accurately expand digital asset scope with minimal user input, such as through combinations of user interface structure and functionality. Additionally, substantial digital asset information can be distilled without connecting to internal systems for additional information, allowing those systems to continue to operate without increasing usage of their limited computing and networking resources.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways. Unless indicated otherwise, "based on" can include one of more of occurring after, being dependent upon, being responsive to, being interdependent with, being influenced by, using information from, being derived from, resulting from, or having a relationship with.

For example, while some embodiments are discussed in a context involving a controller, this element need not be present in each embodiment, as other devices (e.g., embedded devices) may also operate within the disclosed embodiments. Such variations are fully within the scope and spirit of the described embodiments.

The disclosed embodiments may be implemented in a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Moreover, some blocks may be executed iteratively, and some blocks may not be executed at all. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of the these terms is intended to include all such new technologies a priori.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A zero-touch method for clustering cyber credential information, comprising:
   receiving a request for determining whether a credential is malicious;
   aggregating a plurality of cyber credentials configured to provide access to restricted digital information;
   computing similarity scores for pairs of the cyber credentials;
   clustering at least a subset of the cyber credentials into a plurality of cyber credential clusters based on the computed similarity scores;
   digitally tagging the cyber credential clusters with suspicious entity information; and
   generating, based on the request, a data structure of the digitally tagged cyber credential clusters.

2. The zero-touch method of claim 1, wherein the pairs of cyber credentials comprise pairs of passwords and pairs of aliases.

3. The zero-touch method of claim 1, wherein computing the similarity scores comprises using at least one of a Hamming distance algorithm or a Levinstein distance algorithm.

4. The zero-touch method of claim 1, further comprising:
   generating supplemental cyber credentials based on character equivalence rules and the plurality of cyber credentials; and
   computing supplemental similarity scores using the supplemental cyber credentials, wherein the clustering is based on the computed supplemental similarity scores.

5. The zero-touch method of claim 1, further comprising clustering the plurality of cyber credential clusters into mega-clusters.

6. The zero-touch method of claim 1, wherein clustering the at least a subset of the cyber credentials into a plurality of cyber credential clusters comprises:
   clustering a first subset of the cyber credentials into at least one first cluster of a first type;
   clustering a second subset of the cyber credentials into at least one second cluster of a second type;
   identifying a common connection between a first node in the first cluster and a second node in the second cluster; and
   including in the plurality of cyber credential clusters a third node associated with the first node and the second node.

7. The zero-touch method of claim 1, wherein clustering the at least a subset of the cyber credentials into a plurality of cyber credential clusters comprises:
   clustering pairs of passwords into password clusters and clustering pairs of aliases into alias clusters; and
   merging the password clusters with the alias clusters to generate merged clusters, wherein the plurality of cyber credential clusters includes the merged clusters.

8. The zero-touch method of claim 1, wherein the suspicious entity information identifies at least one of a code repository, a domain, a certificate, a social network profile, a legal entity, a financial entity, a cloud service account, a business application, a botnet, or an organization.

9. The zero-touch method of claim 1, further comprising accessing the plurality of cyber credentials from a dataset of leaked credential information.

10. The zero-touch method of claim 1, wherein:
    the suspicious entity information comprises malicious likelihood scores associated with respective cyber credential clusters; and
    the malicious likelihood scores are based on the computed similarity scores.

11. The zero-touch method of claim 1, wherein higher computed similarity scores are correlated with higher malicious likelihood scores.

12. The zero-touch method of claim 1, wherein:
    clustering the at least a subset of the cyber credentials comprises clustering a first subset of the cyber credentials, but not a second subset of the cyber credentials, into the plurality of cyber credential clusters; and
    the method further comprises classifying the second subset of the cyber credentials as associated with non-suspicious actors.

13. The zero-touch method of claim 12, wherein the first subset of the cyber credentials are clustered into the plurality of cyber credential clusters based on their respective computed similarity scores exceeding a similarity score threshold.

14. The zero-touch method of claim 1, further comprising causing display of a visual depiction of the data structure of the digitally tagged cyber credential clusters.

15. The zero-touch method of claim 1, further comprising:
    receiving an input at a user interface;
    providing the input to a language model; and
    receiving, from the language model, an identification of at least one of the plurality of cyber credentials or a source of the plurality of cyber credentials.

16. A non-transitory computer-readable medium including instructions that, when executed by at least one processor, cause the at least one processor to perform operations for clustering cyber credential information, the operations comprising:
    receiving a request for determining whether a credential is malicious;

aggregating a plurality of cyber credentials configured to provide access to restricted digital information;

computing similarity scores for pairs of the cyber credentials;

clustering at least a subset of the cyber credentials into a plurality of cyber credential clusters based on the computed similarity scores;

digitally tagging the cyber credential clusters with suspicious entity information; and generating, based on the request, a data structure of the digitally tagged cyber credential clusters.

17. The non-transitory computer-readable medium of claim 16, wherein the pairs of cyber credentials comprise pairs of passwords and pairs of aliases.

18. The non-transitory computer-readable medium of claim 16, wherein clustering the at least a subset of the cyber credentials into a plurality of cyber credential clusters comprises:

clustering pairs of passwords into password clusters and clustering pairs of aliases into alias clusters; and merging the password clusters with the alias clusters to generate merged clusters, wherein the plurality of cyber credential clusters includes the merged clusters.

19. The non-transitory computer-readable medium of claim 16, wherein:

clustering the at least a subset of the cyber credentials comprises clustering a first subset of the cyber credentials, but not a second subset of the cyber credentials, into the plurality of cyber credential clusters; and the operations further comprise classifying the second subset of the cyber credentials as associated with non-suspicious actors.

20. The non-transitory computer-readable medium of claim 16, the operations further comprising:

receiving an input at a user interface;

providing the input to a language model; and receiving, from the language model, an identification of at least one of the plurality of cyber credentials or a source of the plurality of cyber credentials.

21. The zero-touch method of claim 1, wherein:

the plurality of cyber credentials comprises a first cyber credential and a second cyber credential; and computing the similarity scores comprises comparing first characters of the first cyber credential and second characters of the second cyber credential.

22. The zero-touch method of claim 1, wherein computing the similarity scores comprises converting the plurality of cyber credentials to a quantified representation.

* * * * *

UNITED STATES PATENT AND TRADEMARK OFFICE
CERTIFICATE OF CORRECTION

| | | |
|---|---|---|
| PATENT NO. | : 12,423,406 B1 | Page 1 of 1 |
| APPLICATION NO. | : 18/980850 | |
| DATED | : September 23, 2025 | |
| INVENTOR(S) | : Kobi Ben Naim et al. | |

It is certified that error appears in the above-identified patent and that said Letters Patent is hereby corrected as shown below:

In the Claims

Claim 3, Column 27, Lines 55-56, "a Levinstein distance algorithm" should read --a Levenshtein distance algorithm--.

Signed and Sealed this
Twenty-fifth Day of November, 2025

John A. Squires
*Director of the United States Patent and Trademark Office*